(12) United States Patent
Fallon

(10) Patent No.: US 10,331,153 B2
(45) Date of Patent: Jun. 25, 2019

(54) SYSTEM AND METHOD OF SMART ENERGY STORAGE IN A UPS

(75) Inventor: Raymond M. Fallon, Galway (IE)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 434 days.

(21) Appl. No.: 14/366,493

(22) PCT Filed: Dec. 22, 2011

(86) PCT No.: PCT/US2011/066689
§ 371 (c)(1),
(2), (4) Date: Jun. 18, 2014

(87) PCT Pub. No.: WO2013/095478
PCT Pub. Date: Jun. 27, 2013

(65) Prior Publication Data
US 2014/0379160 A1    Dec. 25, 2014

(51) Int. Cl.
H02J 9/04     (2006.01)
G05F 1/66    (2006.01)
(Continued)

(52) U.S. Cl.
CPC ............... G05F 1/66 (2013.01); G05B 15/02 (2013.01); G06Q 50/06 (2013.01); H02J 3/32 (2013.01);
(Continued)

(58) Field of Classification Search
CPC . G05F 1/66; G05B 15/02; H02J 7/042; Y10T 307/625; Y02B 70/3291; Y02B 90/222; Y04S 20/12; Y04S 20/248
See application file for complete search history.

(56) References Cited

U.S. PATENT DOCUMENTS

2002/0041126 A1* 4/2002 Provanzana ............ H02J 3/28
                                                    307/48
2005/0125172 A1* 6/2005 Patino ................... G06F 1/26
                                                    702/63
(Continued)

FOREIGN PATENT DOCUMENTS

CN          101043145 A      9/2007
WO    WO-2011042786 A1 *    4/2011  ............ H01M 10/44

OTHER PUBLICATIONS

Australian Patent Examination Report from corresponding Australian Patent Application No. 2011383590 dated Apr. 26, 2016.
(Continued)

Primary Examiner — Brian W Wathen
Assistant Examiner — Brian T McMenemy
(74) Attorney, Agent, or Firm — Lando & Anastasi, LLP

(57) ABSTRACT

A method for controlling an uninterruptible power supply (UPS) having a battery includes powering a load coupled to the UPS using utility power, determining whether an energy cost associated with the utility power exceeds a threshold cost, determining whether a charge level of the battery exceeds a threshold charge level, and powering the load from the battery in response to determining that the energy cost exceeds the threshold cost and that the charge level of the battery exceeds the threshold charge level.

17 Claims, 3 Drawing Sheets

(51) Int. Cl.
| | |
|---|---|
| *H02J 3/32* | (2006.01) |
| *H02J 9/06* | (2006.01) |
| *G06Q 50/06* | (2012.01) |
| *G05B 15/02* | (2006.01) |
| *H02J 7/04* | (2006.01) |
| *H02J 9/00* | (2006.01) |
| *H02J 13/00* | (2006.01) |
| *H02J 3/14* | (2006.01) |

(52) U.S. Cl.
CPC .............. *H02J 7/042* (2013.01); *H02J 9/005* (2013.01); *H02J 9/062* (2013.01); *H02J 13/0006* (2013.01); *H02J 2003/146* (2013.01); *Y02B 70/3291* (2013.01); *Y02B 90/222* (2013.01); *Y04S 20/12* (2013.01); *Y04S 20/248* (2013.01); *Y10T 307/625* (2015.04)

(56) References Cited

U.S. PATENT DOCUMENTS

| | | |
|---|---|---|
| 2007/0216228 A1 | 9/2007 | Johnson et al. |
| 2010/0006356 A1 | 1/2010 | Curry et al. |
| 2011/0153131 A1 | 6/2011 | Kressner et al. |
| 2011/0175569 A1* | 7/2011 | Austin ................ B60L 11/1824 320/109 |
| 2011/0185196 A1 | 7/2011 | Asano et al. |
| 2011/0204720 A1* | 8/2011 | Ruiz ................... B60L 11/1816 307/66 |
| 2011/0231028 A1 | 9/2011 | Ozog |
| 2011/0304211 A1* | 12/2011 | Peterson ................ G06F 1/263 307/48 |
| 2012/0123604 A1* | 5/2012 | Littrell .................. H01M 10/44 700/295 |
| 2013/0062949 A1* | 3/2013 | Yan ........................ H02J 9/061 307/64 |

OTHER PUBLICATIONS

Extended European Search Report from corresponding European Application No. 11878291.1 dated Apr. 29, 2016.
International Search Report and the Written Opinion of the International Searching Authority from corresponding PCT/US2011/066589 dated May 4, 2012.

* cited by examiner

SYSTEM AND METHOD OF SMART ENERGY STORAGE IN A UPS

This application is a U.S. National Stage Application under 35 U.S.C. § 371 from International Application No. PCT/US2011/066689, filed Dec. 22, 2011, which is hereby incorporated by reference in its entirety for all purposes.

BACKGROUND OF THE INVENTION

1. Field of Invention

Embodiments of the invention relate generally to power management, and more particularly, to systems and methods of smart energy storage in an uninterruptible power supply.

2. Discussion of Related Art

An uninterruptible power supply (UPS) is typically used to provide backup power to an electrical device, or load, while the primary power source, or mains, is unavailable. A conventional online UPS rectifies input power provided by an electric utility using a power factor correction circuit (PFC) to provide a DC voltage to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is always powered either by mains or the battery, the output power of the UPS is uninterrupted if the mains fails and the battery is sufficiently charged.

Typically, a UPS only acts as a source of backup power. While uninterruptible power supplies are typically used to provide a continuous source of power at a local level (e.g., at a data center or in an office or home), such devices primarily depend on utility power due to the limited capacity of the batteries or other energy storage devices used in conjunction with the UPS. Historically, electric utility service has been demand-driven and inefficient, but increasingly technology is being employed to improve the availability, reliability and efficiency of the electric grid. Commonly, these improved electric grids are called "smart grids."

A "smart grid," as described by the Institute of Electrical and Electronics Engineers (IEEE) of New York, N.Y., includes "a next-generation electrical power system that is typified by the increased use of communications and information technology in the generation, delivery and consumption of electrical energy." As of 2011, a smart grid is considered an overarching and evolving concept that is not limited to any particular technological features, and may also include standards, goals, objectives, and procedures that collectively support the development, implementation, and efficient delivery of reliable, affordable, and sustainable electricity services. Accordingly, no standard definition of smart grid presently exists; rather, the term refers broadly to various interrelated power generation, distribution, and consumption concepts. Some existing electrical power systems presently incorporate one or more elements that may be characterized as forming portions of a smart grid system rather than the whole.

Among other goals, one objective of a smart grid is to intelligently match power generation with power consumption, rather than treating power consumers as being strictly passive. Historically, electric utilities have relied on total load averages, which are relatively stable and can be computed ahead of time, to anticipate power demands based on reasonable expectations of consumer requirements. The total load average is used to determine a baseload or minimum amount of power that a utility needs to make available without risking an interruption of service.

However, the total load connected to a power grid can vary significantly over time; for example, commercial power usage is typically higher during daytime than at night, residential power usage is highest during the early morning and evening hours, and loads also increase during periods where heating or cooling demands are greatest. Therefore, by using a total load average, the baseload (and any additional power generation kept in contingency) may be higher than necessary to support loads that fluctuate in real-time. Accordingly, highly reliable power delivery is achieved at the expense of wasted power that is generated in excess of demand. Furthermore, there may be times when the load increases substantially above the baseload capacity of the power utility with little or no warning, which introduces additional reliability and efficiency costs. Electric utility rates rise in proportion to demand, as additional power is generated.

SUMMARY OF THE INVENTION

According to one embodiment, a method for controlling an uninterruptible power supply (UPS) having a battery includes powering a load coupled to the UPS using utility power, determining whether an energy cost associated with the utility power exceeds a threshold cost, determining whether a charge level of the battery exceeds a threshold charge level, and powering the load from the battery in response to determining that the energy cost exceeds the threshold cost and that the charge level of the battery exceeds the threshold charge level.

In one embodiment, the method may include receiving, by the UPS, an electric utility rate schedule through a communication network, and determining the threshold cost based on the electric utility rate schedule. In another embodiment, the method may include determining whether the charge level of the battery is below a reserve charge level, and powering the load from utility power in response thereto. In yet another embodiment, the reserve charge level may correspond to a predetermined minimum amount of desired time the load can be powered by the battery.

In another embodiment, the energy cost of the utility power may be a first energy cost of the utility power, and the threshold cost may be a first threshold cost. The method may include determining whether a second energy cost of the utility power is less than a second threshold cost based on the electric utility rate schedule, and charging the battery using utility power in response thereto. In yet another embodiment, the method may include calculating a cost savings based on an amount of time the load is powered from the battery and the first energy cost.

In yet another embodiment, the cost savings may be a first cost savings and the amount of time may be a first amount of time. The method may include calculating a second cost savings based on a second amount of time the battery is charged using utility power and the first energy cost.

According to one embodiment, an uninterruptible power supply includes an input configured to receive utility power, at least one battery, an output configured to provide power to a load, and a processor operatively coupled to the input, the battery (or multiple batteries) and the output. The processor is configured to power the load from the input, determine whether an energy cost associated with the utility power exceeds a threshold cost, determine whether a charge level of the battery exceeds a threshold charge level, and power the load from the battery in response to determining that the energy cost exceeds the threshold cost and that the charge level of the battery exceeds the threshold charge level.

In one embodiment, the processor may be operatively coupled to a communication network. The processor may be further configured to receive an electric utility rate schedule through the communication network and determine the threshold cost based on the electric utility rate schedule. In another embodiment, the processor may be further configured to determine whether the charge level of the battery is below a reserve charge level, and to power the load from utility power in response thereto. In one embodiment, the reserve charge level may correspond to a predetermined minimum amount of desired time the load can be powered by the battery.

In another embodiment, the energy cost of the utility power may be a first energy cost of the utility power and the threshold cost may be a first threshold cost. The processor may be further configured to determine whether a second energy cost of the utility power is less than a second threshold cost based on the electric utility rate schedule and to charge the battery using utility power in response thereto. In yet another embodiment, the processor may be further configured to calculate a cost savings based on an amount of time the load is powered from the battery and the first energy cost.

In another embodiment, the cost savings may be a first cost savings and the amount of time may be a first amount of time. The processor may be further configured to calculate a second cost savings based on a second amount of time the battery is charged using utility power and the first energy cost.

In one embodiment, the uninterruptible power supply may include a user interface operatively coupled to the processor. The user interface may be configured to display a representation of at least one of the first cost savings and the second cost savings.

According to one embodiment, an uninterruptible power supply includes an input configured to receive utility power, at least one battery, an output configured to provide power to a load, and means for automatically powering the load from the battery (or multiple batteries) during periods of high energy rates while a charge level of the battery exceeds a threshold charge level, and powering the load from the input during other periods.

In one embodiment, the uninterruptible power supply may include a network interface operatively coupled to the means. The means may be configured to receive an electric utility rate schedule using the network interface. In another embodiment, the uninterruptible power supply may be configured to automatically power the load from the battery during periods of high energy rates and power the load from utility power during other periods based on the electric utility rate schedule. In yet another embodiment, the uninterruptible power supply may be configured to automatically charge the battery during periods of low energy rates based on the electric utility rate schedule. In yet another embodiment, the means may be further configured to calculate a cost savings realized from powering the load from the battery during periods of high energy rates.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
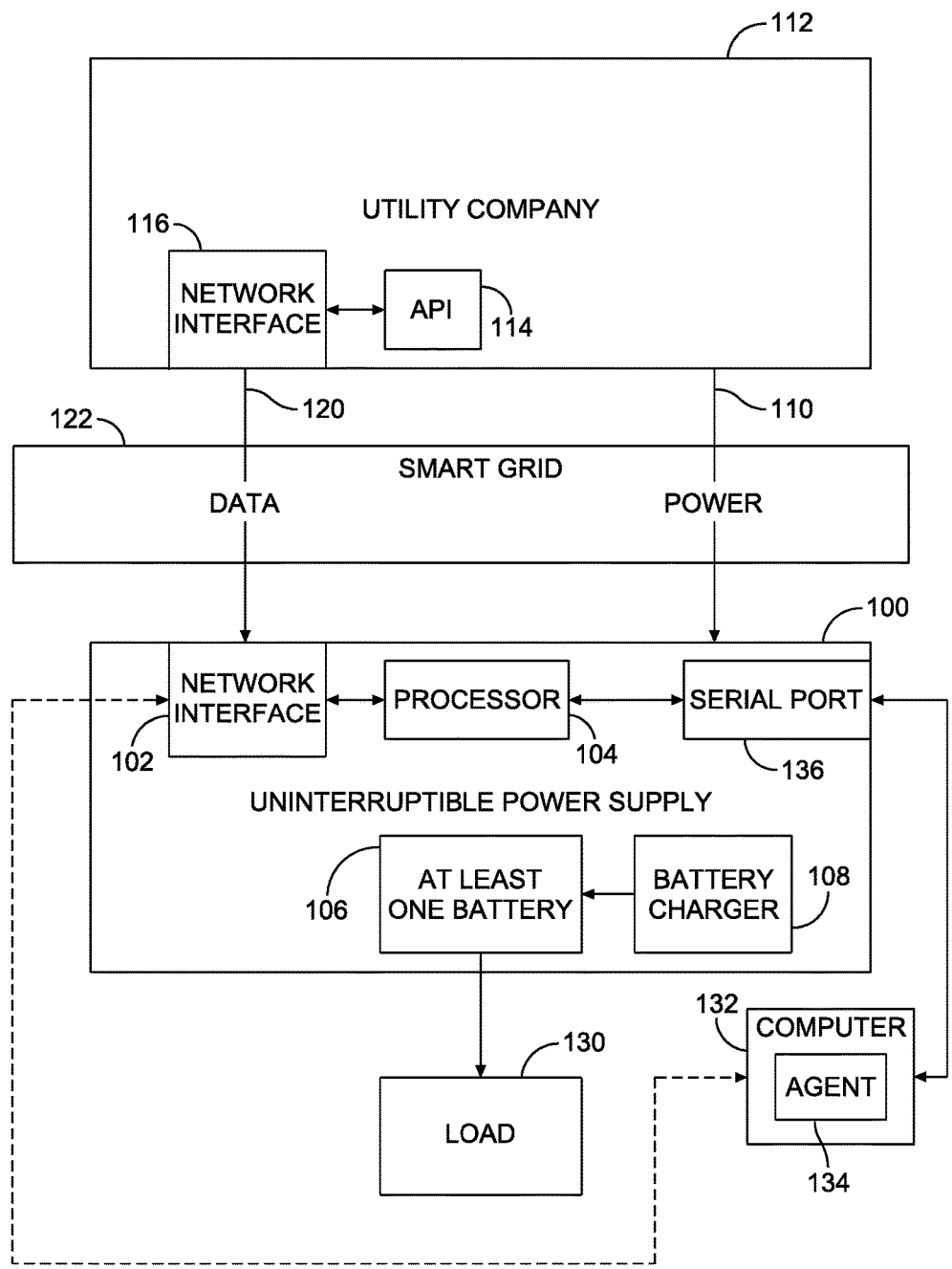
FIG. 1 is a block diagram of one example of an uninterruptible power supply in accordance with one embodiment of the present invention.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments relate to power conversion in a UPS; however, embodiments of the invention are not limited for use in uninterruptible power supplies and may be used with other power supplies or other power systems generally. Further, while at least some examples below describe uses with respect to online UPS's, some embodiments can be used with other types of UPS's.

As discussed above, because the total load connected to the power grid can vary significantly, including UPS loads, there may be times during which the electric utility charges higher rates for energy delivered during periods of peak demand. Although one way to reduce energy costs is to reduce the load while energy rates are high, it is not always convenient to do so, especially for critical loads that cannot be shut down at certain times, or at all. Instead, according to some embodiments, energy expenses incurred by a power consumer can be reduced by shifting loads away from the electric utility to a secondary source of power, such as the battery of a UPS, during high rate periods.

Some organizations, such as the European Union-sponsored Smarthouse/SmartGrid project, are working on augmenting existing one-way power-only feeds into homes and buildings by providing open standards ICT interfaces on existing IP-based networks, which also serve these same consumers. Such ICT interfaces can be implemented using an application programming interface (API), which can be used to inform consumers when electricity is available, scarce, cheap or expensive. The API may also, for example, be implemented as a two-way communication channel for providing utility companies with the ability to retrieve usage data from consumers in real-time. In one embodiment, the UPS is configured to communicate with the utility company and/or smart grid using the API to send and receive utility rate and usage information. Among other uses, this information may enable the utility companies to deliver enough power to satisfy demand and help balance electricity generation with actual usage to reduce waste. The information may also be used by the consumer to adjust usage patterns to take advantage of lower energy rates during certain time periods. Such uses can substantially increase energy efficiency throughout the grid as well as reducing costs.

Although conventional uninterruptible power supplies are primarily designed to provide backup power (e.g., from a battery) when the utility power is poor or unavailable, a UPS, according to one embodiment, can be configured to act as an active source of power for a load using the battery instead of utility power during high energy rate periods, so long as the battery has sufficient capacity to power the load. In one embodiment, the UPS can be configured to maintain a reserve capacity in the backup power source as a contingency for power outages, since the backup power source has a limited capacity. In another embodiment, a UPS can be configured to charge the backup power source (e.g., a battery) primarily during periods when energy is relatively inexpensive. By operating the UPS in one or more of the manners described above, the UPS can be used not only as a source of backup power, but also as a limited source of less expensive power by enabling intelligent use of utility power to take advantage of variable energy rates.

FIG. 1 is a block diagram of an uninterruptible power supply (UPS) 100 according to one embodiment. The UPS 100 receives AC utility power 110 from a utility company 112, for example, over a conventional power grid. The utility company 112, which may be part of, or connected to, a smart grid system 122, provides an application programming interface (API) 114 that enables the utility company 112 to make information available to consumers about the cost of the energy and, potentially, imminent energy supply problems (e.g., anticipated brownouts, blackouts, or other operational irregularities). The information may be provided using a Service Oriented Architecture (SOA) (e.g., RESTful), as is commonly used for Internet-based services, or another type of API. The information can be transmitted as data 120 through a network interface 116 and a communication network, which may be part of a smart grid 122, to the UPS, which includes a network interface 102 of its own (e.g., an intelligent network management card or a software agent 134 that resides on a computer 132 connected to the UPS 100) for communicating on the communication network. The data can be consumed by the UPS 100, for example, using an integrated processor 104 operatively connected to the communication network. The UPS 100 includes at least one energy storage device, such as a battery 106 or multiple batteries, for storing power, and a battery charger 108 for charging the battery 106. An electrical load 130 may be connected to the UPS 100.

For example, the data 120 may contain information generated by the utility company 112 regarding energy availability and cost. One form of the data 120 can include an electric utility rate schedule, which describes the cost of energy for a particular customer or class of customers on the basis of usage, time of day, and/or other related factors. The UPS 100 may poll the smart grid 122 on a periodic basis for this information, or, alternatively, the utility company 112 or other entity in the smart grid 122 may actively push the information to the UPS 100, depending on how the smart grid 122 is configured. In one embodiment, the processor 104 can be configured to respond to the information by switching the operating mode of the UPS 100 to act as an energy storage device during times of expensive energy or when energy is predicted to become unavailable. When the battery 106 becomes discharged below a certain threshold, the processor 104 can cause the UPS 100 to switch back to AC utility power 110 to prevent the battery from becoming depleted and preserve the battery charge for future power interruptions.

In another embodiment, some of the functions of the processor 104 can be implemented in a computer 132 running an agent component 134, a network management card having a processor and memory, or a distributed processing system. The computer 132 is connected to the processor 104 of the UPS 100 via a serial port 136 or other data interface, such as the network interface 102, an Ethernet port (not shown) or network management card (NMC). The agent 134 can be configured to process the data 120 and/or control some of the operation of the UPS 100 (e.g., switching between utility power and battery modes). In another embodiment, the UPS 100 and/or the computer 132 can be configured to generate reports of energy usage and cost saved due to the load shifting capability of the UPS 100. The reports may be presented to a user, for example, through a graphical user interface or other message service, such as electronic mail or text message.

In one embodiment, the battery charger 108 can be activated by the processor 104 based on the cost of electricity, as determined from the information received from the utility company 112. For example, the UPS 100 may charge the battery 106 only when energy is relatively cheap, unless charging is needed at other times to replenish the charge in the battery 106. Another example of how the data 120 may be used by the UPS 100 is described below with respect to FIG. 2.

Figure 2:
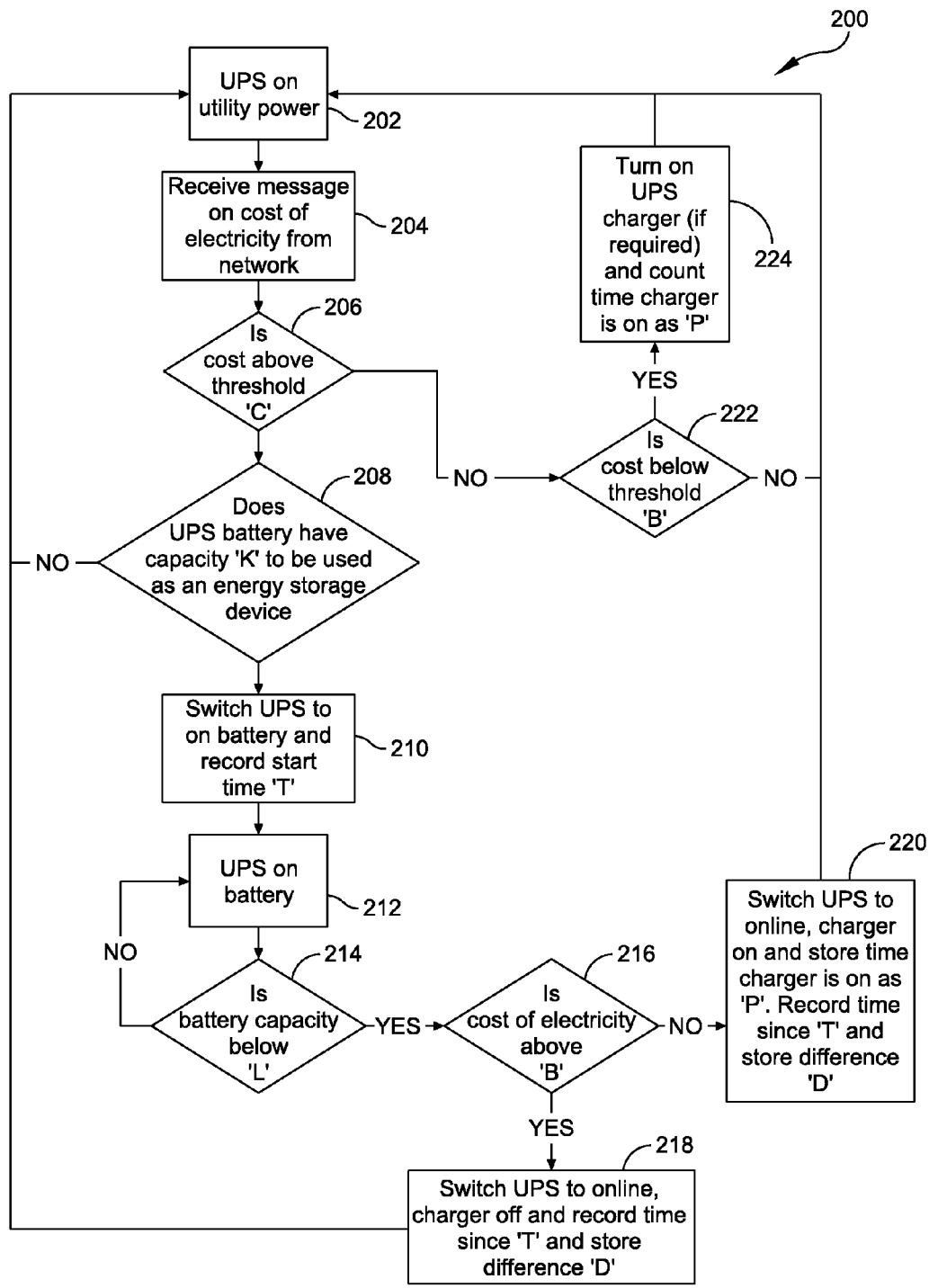
FIG. 2 is a flow diagram of one example of a process for controlling a UPS in accordance with one embodiment of the present invention.

FIG. 2 is a flow diagram of a process 200 for operating a UPS, according to one embodiment. Table 1 lists the legend for various terms shown in FIG. 2. In one embodiment, one or more of the terms in Table 1 below can be configured by the user.

TABLE 1

Defined terms for flow chart of FIG. 2.

| | |
|---|---|
| C | Cost of electricity above which the UPS may operate as an energy storage device |
| B | Cost of electricity below which the UPS may operate the battery charger |
| T | Start time that the UPS may operate as the energy storage device |
| D | Total time that the UPS has operated as the energy storage device |
| K | Battery capacity above which the UPS may operate as an energy storage device (e.g., 75-99%) |
| L | Battery capacity below which the UPS may switch online to preserve reserve battery capacity (e.g., 25-70%) |
| P | Time that the battery charger is on |

At block 202, the UPS powers a load using utility power. At block 204, the UPS receives a message regarding the cost of electricity on the power grid. When the utility or smart grid reports that energy rates are high (e.g., above threshold C, block 206), the UPS switches the load to the battery and records the time-on-battery and the cost that the equivalent amount of energy would have cost if sourced from the utility instead of the battery (block 210). The cost can be used to calculate the amount of money saved by powering the load from the battery instead of from the power grid. The UPS may switch the load to the battery if there is sufficient reserve capacity in the battery (e.g., above capacity K, block 208); otherwise, the UPS continues to power the load using utility power (block 202) so as not to compromise the primary function of the UPS, which is to ensure uninterrupted power to the load. At block 212, the UPS powers the load using the battery.

If, as above, the utility or smart grid reports that energy rates are low (e.g., below threshold C, block 206) and the energy rates are below threshold B (block 222), the UPS charges the battery, if necessary, and records the charging time (block 224). The cost and/or cost savings of charging the battery at the prevailing energy rates can thus be calculated and presented to the consumer.

At block 214, when the battery in the UPS becomes discharged below level L, the UPS switches the load from the battery to the utility, but keeps the battery charger turned off (block 218) until the cost of energy as reported by the utility or smart grid is low (e.g., below level B, block 216) at which time the battery charger may be turned on, if necessary. The time that the battery is being charged is calculated (block 220), and the cost of energy that would have been used to charge the battery, at the high rate, during that time is also calculated so that the savings resulting from charging the battery at the lower rate can be calculated and presented to the consumer.

Figure 3:
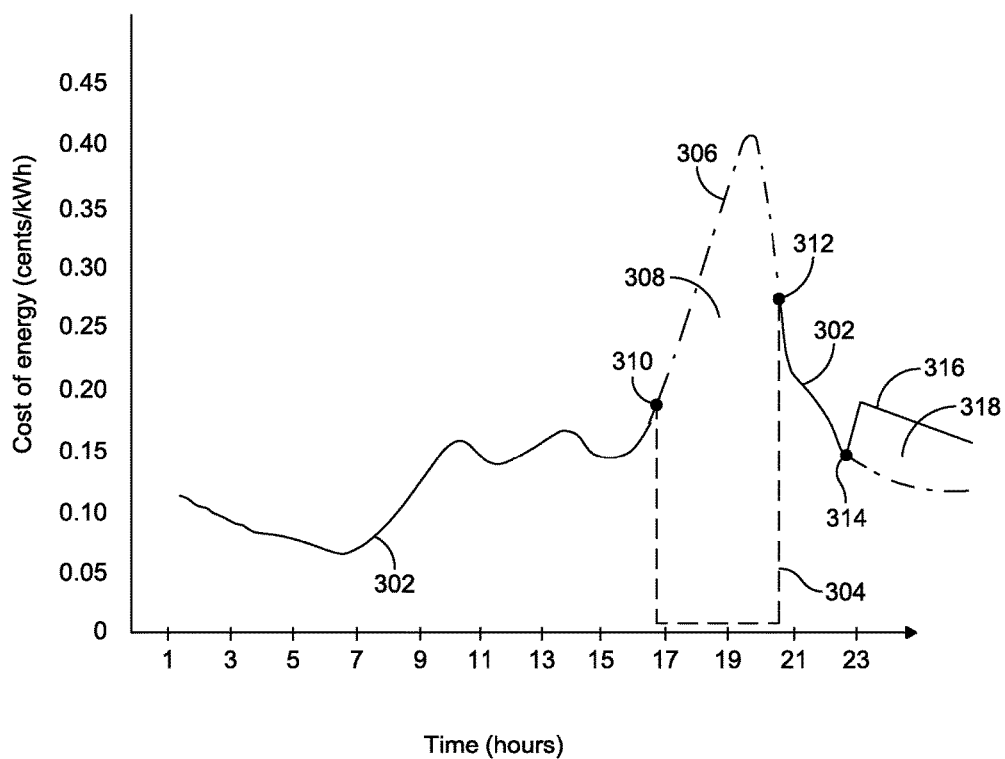
FIG. 3 is one example of a user interface in accordance with one embodiment of the present invention.

The cost of energy saved using one or more of the above techniques, according to one embodiment, can be calculated as follows:

$$E=\Sigma(D_n Y_n)-\Sigma(P_n Y_n),$$

where $Y_n$ is the average cost of energy at time n over the total period of time. In one embodiment, a user interface is provided to the user to report the operating mode of the UPS and to display the energy cost savings. FIG. 3 shows one example of a user interface including a graph of energy cost and actual cost plotted over the course of one day (not drawn to scale). It will be understood that the data shown in the graph of FIG. 3 is merely exemplary, and that the actual energy cost is variable and dependent on many factors, including demand, fuel costs and market forces.

In FIG. 3, line 302 shows points where the actual cost of energy as reported by the utility company is the same as the actual cost of energy incurred by the user; that is, the user is using utility power during those periods of time and therefore incurring cost at the prevailing utility rates. At point 310, the actual cost of energy 306 rises sharply, at which point, in this example, the UPS switches operating modes to power the load from the battery instead of from utility power, thus causing the actual cost of energy to become nil. As discussed above, the cost of the power used to charge the battery is low because the battery is charged during periods when the utility rates are relatively low. Line 304 reflects the fact that energy costs drop to nil when the UPS is powering the load from the battery rather than from utility power. Line 306 shows the actual cost of energy during the period of time while the UPS is running on battery. At point 312, before the charge level of the battery is depleted, the UPS switches from battery to utility power. The point 312 can occur at different points in time depending on the load, the capacity and charge level of the battery, and the desired reserve capacity (e.g., an amount of charge remaining in the battery to power the load for a certain period of time after utility power is lost). For example, if a large reserve capacity is desired, the amount of time the UPS can power the load from the battery may be less than if a small reserve capacity is desired. The user interface of FIG. 3 assumes a constant load and that the UPS did not switch the load to the battery for any reason other than for energy savings. The area between lines 304 and 306 (indicated at 308) represents the cost savings realized as a result of drawing power from the battery rather than from utility power at the higher rate.

FIG. 3 also shows that, at point 314, when the actual cost of energy 302 is relatively low, the UPS may charge the battery using utility power to take advantage of the low cost. The actual cost 316 incurred by the user during this period of time is higher than the actual cost 302 reported by the utility because power is being used to simultaneously charge the battery and power the load. The area between lines 306 and 316 (indicated at 318) represents the additional cost incurred (above the cost resulting from powering the load with utility power) as a result of charging the battery during this period of time. Thus, the UPS can operate as an energy storage device by storing utility power when the rates are low for later use in powering the load (in lieu of utility power) when the rates are high.

In one embodiment, the UPS can be configured to provide one or more of the following features:

Provide recommended actions to the user. For example, the UPS could be configured to recommend energy tariffs based on the environment of the user and the nature of the load supported by the UPS. In another example, the UPS could recommend installing additional batteries to provide additional power savings.

Allow the user to configure the threshold rates (e.g., rates that trigger switching the UPS to battery power, or rates that trigger the UPS to charge the battery, if necessary). The threshold rates may, for example, be default values or may be derived from information provided by the utility company and/or smart grid.

Provide automated switching operations. For example, as discussed above, the UPS may continue to act as a source of backup power while also automatically acting as a source of power during periods of high electric rates. In another example, the UPS may monitor the reserve capacity of the battery or batteries and automatically switch from battery power to utility power when necessary to avoid depleting the battery, which could compromise the backup function of the UPS.

Report generation. For example, the UPS, or a computer using data provided by the UPS, may generate reports, in a variety of formats, for a user on the cost of energy saved by using battery power instead of utility power during peak rate periods, and by charging the battery during off-peak rate periods, taking into account the time the load is being powered from the battery and/or the time the battery is being charged.

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide pulse width modulated (PWM) signals to each of the switching devices within the circuit for controlling the power conversion functions. In another example, the controller may provide control signals for the relays. In general, the controller controls the operation of the UPS such that it charges the battery from the AC power source when power is available from the AC power source, and inverts DC power from the battery when the AC power source is unavailable or during brown-out conditions. The controller can include hardware, software, firmware, a processor, a memory, an input/output interface, a data bus, and/or other elements in any combination that may be used to perform the respective functions of the controller.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series internal or external to a UPS.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. For example, the battery in the UPS may be a lead acid battery, or a lithium ion battery. Lithium ion batteries have the advantage of being able to store more energy for their size than lead acid batteries and do not suffer from the memory problems of lead acid batteries caused by repeated charge/discharge cycles. In another example, some embodiments can be implemented in a UPS having an intelligent network management card that allows users to monitor, configure and control various functions of the UPS over a communication network. Accordingly, the foregoing description and drawings are by way of example only.

What is claimed is:

1. A method for controlling an uninterruptible power supply (UPS) having a battery, the method comprising acts of:
    powering a load coupled to the UPS using utility power in a first operating mode of the UPS;
    determining, by a controller of the UPS, in the first operating mode, whether an energy cost associated with the utility power exceeds a first threshold cost;
    determining, by the controller, in the first operating mode, whether a charge level of the battery exceeds a threshold charge level;
    automatically switching from the first operating mode to a second operating mode of the UPS, by the controller, to power the load from the battery in response to determining that the energy cost associated with the utility power exceeds the first threshold cost and that the charge level of the battery exceeds the threshold charge level;
    determining, by the controller, in the first operating mode, whether an energy cost associated with the utility power is below a second threshold cost, the second threshold cost being lower than the first threshold cost;
    automatically switching from the first operating mode to a third operating mode of the UPS, by the controller, to power the load from utility power while simultaneously charging the battery using utility power in response to determining that the energy cost associated with the utility power is below the second threshold cost;
    determining, by the controller, in the first or second operating mode, whether the charge level of the battery is below a reserve charge level, the reserve charge level being lower than the threshold charge level; and
    automatically switching from the first or second operating mode to the third operating mode of the UPS, by the controller, to power the load from utility power while simultaneously charging the battery using utility power in response to determining that the charge level of the battery is below the reserve charge level.

2. The method of claim 1, further comprising receiving, by the controller, an electric utility rate schedule through a communication network and determining, by the controller, one of the first threshold cost and the second threshold cost based on the electric utility rate schedule.

3. The method of claim 1, wherein the reserve charge level corresponds to a predetermined minimum amount of desired time the load can be powered by the battery.

4. The method of claim 1, further comprising calculating, by the controller, a cost savings based on an amount of time the load is powered from the battery and the energy cost.

5. The method of claim 4, wherein the cost savings is a first cost savings, wherein the amount of time is a first amount of time, and wherein the method further comprises calculating, by the controller, a second cost savings based on a second amount of time the battery is charged using utility power and the energy cost.

6. An uninterruptible power supply, comprising:
    an input configured to receive utility power;
    at least one battery;
    an output configured to provide power to a load; and
    a processor operatively coupled to the input, the at least one battery and the output, the processor configured to:
        power the load from utility power in a first operating mode;
        determine, in the first operating mode, whether an energy cost associated with the utility power exceeds a first threshold cost;
        determine, in the first operating mode, whether a charge level of the at least one battery exceeds a threshold charge level;
        automatically switch from the first operating mode to a second operating mode to power the load from the at least one battery in response to determining that the energy cost associated with the utility power exceeds the first threshold cost and that the charge level of the battery exceeds the threshold charge level;
        determine, in the first operating mode, whether an energy cost associated with the utility power is below a second threshold cost, the second threshold cost being lower than the first threshold cost;
        automatically switch from the first operating mode to a third operating mode to power the load from utility power while simultaneously charging the battery using utility power in response to determining that the energy cost associated with the utility power is below the first and second threshold cost;
        determine in the first or second operating mode, whether the charge level of the at least one battery is below a reserve charge level, the reserve charge level being lower than the threshold charge level; and
        automatically switch from the first or second operating mode to the third operating mode to power the load from utility power while simultaneously charging the at least one battery using utility power in response to determining that the charge level of the at least one battery is below a reserve charge level.

7. The uninterruptible power supply of claim 6, wherein the processor is operatively coupled to a communication network, and wherein the processor is further configured to receive an electric utility rate schedule through the communication network and determine one of the first threshold cost and the second threshold cost based on the electric utility rate schedule.

8. The uninterruptible power supply of claim 6, wherein the reserve charge level corresponds to a predetermined minimum amount of desired time the load can be powered by the at least one battery.

9. The uninterruptible power supply of claim 6, wherein the processor is further configured to calculate a cost savings based on an amount of time the load is powered from the at least one battery and the energy cost.

10. The uninterruptible power supply of claim 9, wherein the cost savings is a first cost savings, wherein the amount of time is a first amount of time, and wherein the processor is further configured to calculate a second cost savings based on a second amount of time the at least one battery is charged using utility power and the energy cost.

11. The uninterruptible power supply of claim 10, further comprising a user interface operatively coupled to the processor, wherein the user interface is configured to display a representation of at least one of the first cost savings and the second cost savings.

12. An uninterruptible power supply, comprising:
an input configured to receive utility power;
at least one battery;
an output configured to provide power to a load;
means for automatically powering the load from the input during periods of low energy rates, then automatically powering the load from the at least one battery during periods of high energy rates if a charge level of the at least one battery exceeds a threshold charge level, and continuing to power the load from the at least one battery until the charge level of the at least one battery drops below a reserve charge level that is lower than the threshold charge level, then automatically powering the load and charging the at least one battery from the input in response to the charge level of the at least one battery dropping below the reserve charge level; and
means for determining, while powering the load from the input, that an energy cost is less than a threshold cost and for charging the at least one battery from the input in response to determining that the energy cost is less than the threshold cost.

13. The uninterruptible power supply of claim 12, further comprising a network interface operatively coupled to the means for automatically powering the load, wherein the means for automatically powering the load is configured to receive an electric utility rate schedule using the network interface.

14. The uninterruptible power supply of claim 13, wherein the uninterruptible power supply is configured to automatically power the load from the at least one battery during periods of high energy rates and power the load from utility power during other periods based on the electric utility rate schedule.

15. The uninterruptible power supply of claim 14, wherein the uninterruptible power supply is configured to automatically charge the at least one battery during periods of low energy rates based on the electric utility rate schedule.

16. The uninterruptible power supply of claim 12, wherein the means for automatically powering the load is further configured to calculate a cost savings realized from powering the load from the at least one battery during periods of high energy rates.

17. The uninterruptible power supply of claim 12, wherein the reserve charge level corresponds to a predetermined minimum amount of desired time the load can be powered by the battery.

* * * * *